May 9, 1972 R. E. SHETTEL Re. 27,353
IRRIGATION CONTROL
Original Filed July 25, 1966
FIG. 1
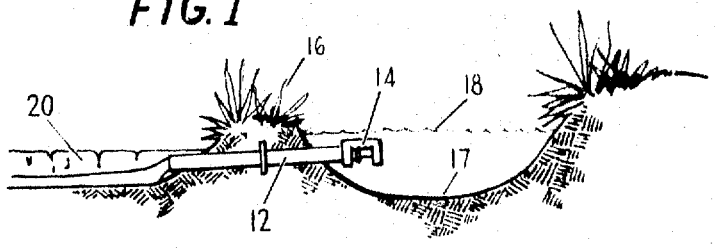
FIG. 3
FIG. 2
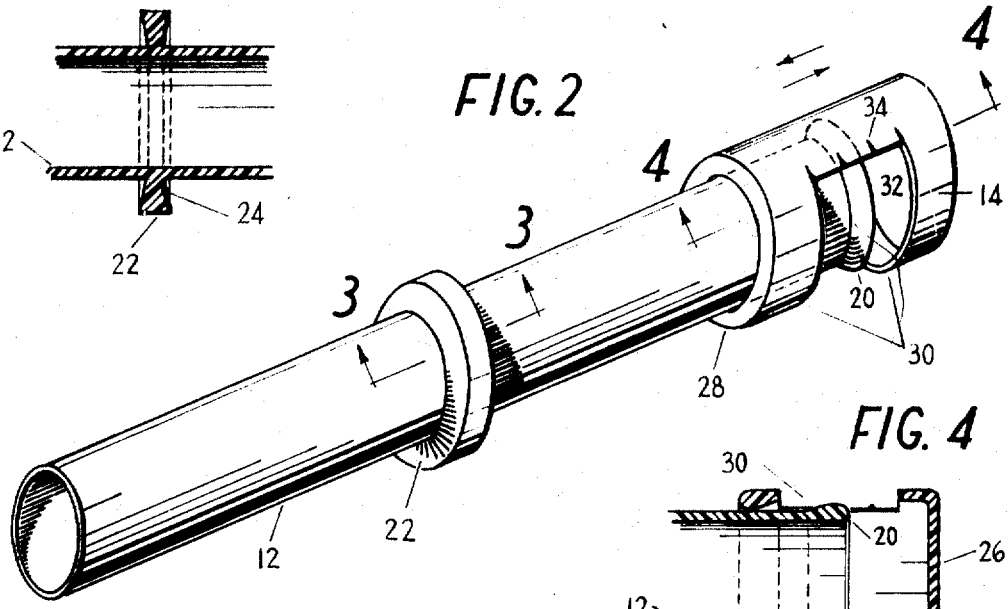
FIG. 4
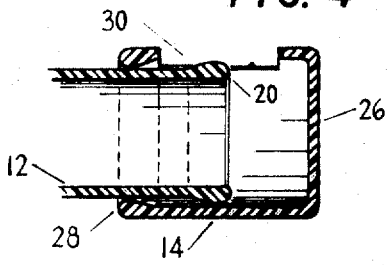
FIG. 5
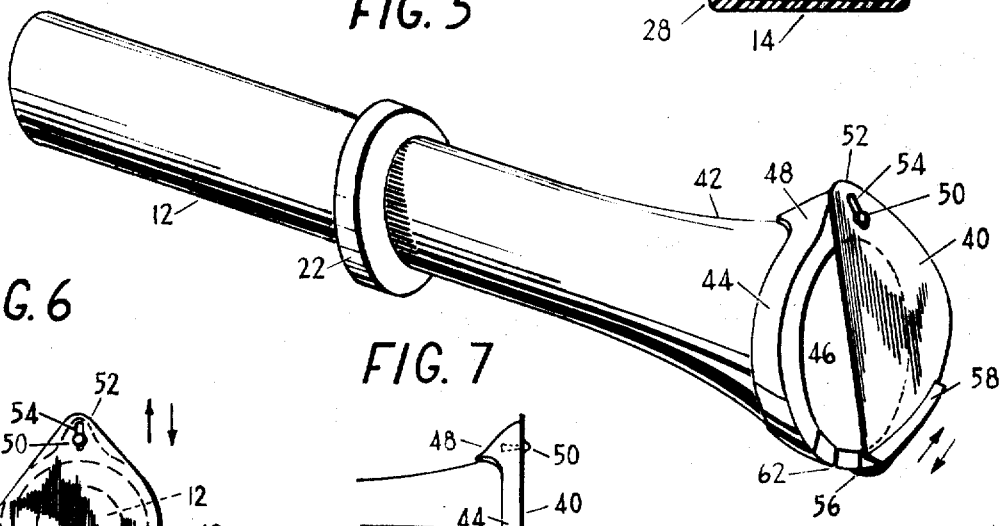
FIG. 6
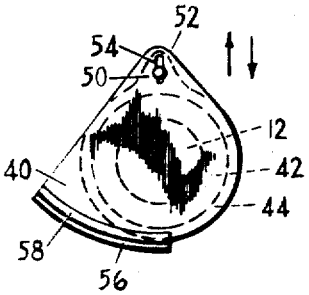
FIG. 7
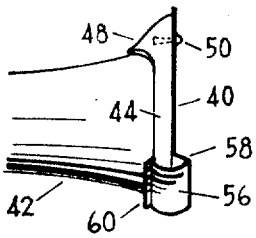
INVENTOR
Ralph E. Shettel

United States Patent Office

Re. 27,353
Reissued May 9, 1972

27,353
IRRIGATION CONTROL

Ralph E. Shettel, Rte. 1, Twin Falls, Idaho 83301

Original No. 3,400,909, dated Sept. 10, 1968, Ser. No. 567,444, July 25, 1966. Application for reissue Oct. 16, 1969, Ser. No. 877,915
Int. Cl. F16k *3/00*
U.S. Cl. 251—147 4 Claims

Matter enclosed in heavy brackets [ ] appears in the original patent but forms no part of this reissue specification; matter printed in italics indicates the additions made by reissue.

ABSTRACT OF THE DISCLOSURE

[A water metering apparatus having an adjustable inlet device which regulates the flow of water to the field corrugates through a tube.]

*An irrigation ditch valve locating in the earth or concrete lined open ditch bank for the identical metering and automatic distribution of waters to farm lands. The metering means comprising an adjustable cap or gate portion acting with a conduit portion to selectively size a water inlet responsive to crop and seasonal demands. A ditch valve system typically feeding individual corrugates and furrows, or accumulating to feed between borders and dikes through equal spacing and level alinement that affords valve identity through uniform submersion below the checked water line.*

Present day methods of water distribution over farm lands are varied. This present invention relates to the corrugate *and border* [method] *methods* and more particularly to a water metering device capable of eliminating the omissions and excesses in water use inherent with this irrigation process.

Persons conversant with the art to which the invention relates are aware that water is delivered to farm lands through a network system of graded ditches. From a high-ground lateral or canal source, a feed ditch brings the irrigation water to the field. Along the edge of the field to be irrigated, numerous short independent head ditches *are often seen to* lateral off and parallel the feed ditch and serve to head-up sets of [fifteen] *twenty* or so corrugates. The feed ditch is checked to *raise and* divert water [into the head ditch and finally the corrugates] *to the field.* Since *the feed ditch cutout and* the corrugate inlets are cut into the [head] ditch bank with a shovel, undesired capacity variations are realized. Further, improper balancing and maintenance by the irrigator plus the continuing erosion *and plugging* results in water discrepancies being sent through the field. The excesses cause the loss of thousands of acre feet of water and the accompanying erosion of tons of soil yearly. The omissions result in the obvious interruption in plant growth and prosperity.

Briefly, the invention features novel means for controlling and stopping the flow of water to the [corrugates] *field.* The means preferred comprises a plastic [tube] *conduit* assembly with an inlet device capable of maintaining a set flow of water. This is a primary objective of the invention.

It is another objective of the invention to provide flexibility in volume through metering thus allowing water volumes to meet the varying field conditions and *crop* demands.

It is yet another object of the invention to allow the irrigator visual, positive and lasting, balanced by choice water sets.

A further object of the invention is to realize a conservation of water and soil through efficient water use thus preserving and extending our natural resources.

The above listed objects of the invention and other advantages and objects will be best noted and understood when the following descriptive specification of embodiment is taken in conjunction with the accompanying drawings wherein, like numerals refer to like parts throughout, and in which:

FIG. 1 is a view in section illustrating the [corrugate minder] *ditch valve* in location and use;

FIG. 2 is a view in perspective of [one] *the preferred* embodiment of the invention;

FIG. 3 is a fragmentary sectional view taken along section line 3—3 of FIG. 2;

FIG. 4 is also a fragmentary sectional view taken along section line 4—4 of FIG. 2;

FIG. 5 is a view in perspective of another embodiment of the metering device;

FIG. 6 is a front elevation thereof; and

FIG. 7 is a side elevation thereof.

Referring now to the drawings in detail, wherein the basic embodiment of the invention is disclosed in FIG. 1 in which a [corrugate minder] *ditch valve* assembly is shown as comprising a [preferably moulded] plastic [tube] *conduit unit* 12 and metering unit 14 located and properly [placed] *positioned* in [the head] ditch bank 16. As the [head] ditch 17 fills with water 18, it is metered to the corrugate 20 by passing through the [corrugate minder] *ditch valve* assembly.

[As shown in] *In the preferred embodiment of* FIG. 2, [and FIG. 4,] the plastic wall of [tube] *conduit* 12 is uniformly thickened [outwardly] at one extremity to form perimeter welt 20. A seepage dam 22 laterally collaring [tube] *conduit* 12 at its [midpoint] *midportion* is seen in FIG. 3 as a substantial lateral extension *depending the conduit wall.* [with sides disposed inwardly from their outer edges as converging plains 24, slanting to form a wedge with the outside surface of tube 12.] *An alternate arrangement could be applied to bear against the conduit structure for the same purpose.* Since [tube] *conduit* 12 is vulnerable to seepage and washout, dam 22 is provided to obstruct and stop [this] seepage. [and its shape aids in the compaction of soil against the perimeter of tube 12.] Metering cap 14, FIG. 4, is essentially a modified tube *section* with [a] *an outward* closed end 26 [at one extremity] and [a uniform inward thickening at the opposite extremity forming] *an inward open end preferably thickened to form* circumferential stiffener 28. The inlet window 30, FIG. 2, cut into the wall [of cap 14] *thereof* is [preferably set against stiffener 28 and proportionally] sized to accommodate the maximum flow allowed by [tube] *conduit* 12. The relative sizes of [tube] *conduit* 12 and metering cap 14 *permits* [permit the stiffening ring 28 of metering cap 14 to be pressed over tube welt 20 and thereby come into sliding contact with the outside surface of tube 12. As seen in FIG. 4, the similar] *a* frictional sliding contact [of] *with* welt 20 [against the inside surface of cap 14 forms] *forming* a circumferential water seal which travels along window 30 to form [a water] *an* inlet 32 of varying size. *Beyond the seal consideration, welt 20 and stiffener 28 serve to close the existing differential between any two sizes of stock tubing thusly eliminating the need for special manufacture. With special manufacture, the differential could be eliminated.* [Tube welt 20] *Conduit 12* and cap [stiffener 28] *14* work conversely along their common axis and possess similar proportions with like tolerances which promote a smooth telescoping action. Further, by pulling-out and pushing-in [on cap 14,] the *relative* size of the water inlet 32 [, FIG. 2,] so formed produces the desired [water] metering. In the shutoff position, [welt 20 rests against the cap end 26 or] cap 14 is pushed all the way in. For maximum flow,

[welt 20 rests against cap stiffener 28 or] cap 14 is pulled all the way out. [Meter markings] *Reference marks* 34 along cap window 30 assist in mixing or matching for selective metering [or shutoff.]

An alternate embodiment of the invention is depicted in FIG. 5 and provides means for accomplishing the desired metering through the use of a laterally swinging quadrant gate 40. The wall of [plastic tube] *conduit* 12, in this case, is swelled horn fashion 42 and uniformly thickened outwardly [forming] *to form* perimeter welt 44. [which is at the extremity common with gate 40. This] Swelling 42 permits gate 40 to function properly over the end of [tube] *conduit* 12, though partially obstructing its opening, by providing a water inlet 46 of sufficient size to accommodate the maximum flow allowed by [tube] *conduit* 12. A water seal is formed by gate 40 working against circumferent welt 44. Gate 40 is preferably fabricated out of an aluminum alloy gauged to resist bending and warp. A seepage dam 22 collaring [tube] *conduit* 12 at its [midpoint] *midportion* is seen in FIG. 3 as [a] *the same* substantial lateral extension *herein fully described for FIG. 2 of the drawings.* [with sides disposed inwardly from their outer edges as converging plains 24 slanting to form a wedge with the outside surface of tube 12.] Since [tube] *conduit* 12 is vulnerable to seepage and washout, dam 22 is provided to obstruct and stop [this] seepage. [and its shape aids in the compaction of soil against the perimeter of tube 12.] As shown in FIG. 6, the uppermost edge of gate 40 [is extended lobe fashion 52 and] *has* an [elongated] *elongate* hole 54 [is] symmetrically punched therein. [Correspondingly, tube welt 44 is substantially thickened at its uppermost point 48 to provide anchorage for gate pin 50.] Pin 50 is set [through] *therethrough* [elongated hole 54] and *anchored* into [the] welt *44* [thickening 48 of tube welt 44] loose enough to allow gate 40 vertical and lateral travel yet retain frictional contact. [with tube welt 44.] It will be noted in FIG. 7, that the lower edge of gate 40 is laterally extended inwardly to form clasp 56 [which is] disposed to engage and frictionally hold to welt 44. A reflex bend 58 at its beginning serves as [the] *a* pressure point in intiating [the downward] *vertical* travel [of gate 40] and the hook ending 60 insures a positive grip. [over welt 44. Further, gate clasp 56 is released from tube welt 44 by a downward pressure on reflex bend 58.] It follows then that gate 40 is free to swing laterally to any desired position and form a water inlet 46 of varying size. [In position, an upward pressure on gate 40 engages clasp 56 over tube welt 44 and the water inlet 46, FIG. 4, so formed produces the desired water metering. Meter markings] Reference marks 62 along welt 44 assist in the mixing or matching for selective metering [or shutoff.]

The invention also has considerable use in the general area of water diversion. [by making the size fit the circumstance. Slight adjustments would also allow the incorporation of automatic devices and timers.] *Its insertion directly into the sidewall of feed ditches lined with concerete has particular application since the fall is typically slow. Irrigation labors are thereby substantially reduced since the head ditch as such is eliminated. Efficiency is increased through amplification and the delegation of more land area to farm production. Furthermore, this distribution system can meet any irrigation demand, individually for corrugates and furrows, in combination as an accumulating head for borders and dikes, or by sizing the ditch valve to fit the circumstance or irrigation requirement for takeouts and other diversion outlets. This automation allows the serious consideration of actuators and timers for the check or dam mechanism since the metering manipulation is delegated to the ditch valve.*

As will now be apparent, the construction herein described is capable of being converted to alternate arrangements. In FIG. 2, it is shown as a metering device with a telescoping type cap and in FIG. 5, the metering device is shown as a type gate. It would be easy to contrive additional means within the spirit and scope of the invention. It would be easy to contrive additional means within the spirit and scope of the invention. It is obvious then that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to as falling within the scope of the invention as claimed.

What is claimed as new is as follows:

[1. A corrugate minder comprising a tube unit and metering cap unit with related proportions which permit said cap to be pressed over said tube end and slide conversely, one over the other, along their common axis, said cap having a closed end at one extremity and a uniform inward thickening of the cap wall at the opposite extremity to form a perimeter stiffener disposed to act along the outside surface of said tube, correspondingly the wall of said tube being uniformly thickened outwardly to form a perimeter welt disposed to frictionally act along the inside surface of said cap and form a ring seal, said stiffener and said welt having tolerances which promote a smooth telescoping action, a window cut into the wall of said cap proportionally sized to accommodate the maximum flow allowed by said tube whereby said ring seal in sliding the length of said window forms a water inlet of varying size, said water inlet being selectively sized by pushing-in or pulling-out on said cap to produce the desired controlled metering or shutoff, meter markings along said cap window to aid in the mixing or matching of water sets and means for blocking seepage along said tube exterior by collaring its midpoint with a dam existing as a substantial outward lateral extension of the tube wall.]

[2. In combination, a corrugate minder embodying a tube and metering quadrant gate, said gate acting laterally over the end of said tube to produce a water inlet of varying size, said tube being swelled horn fashion to a uniform outward thickening of the tube wall to form a perimeter welt at the extremity common with said gate, said welt acting against said gate to produce a water seal, said swelling affording a water inlet sized to accommodate the maximum flow allowed by said tube though partially obstructed by said gate, said gate extending lobe fashion at its uppermost point and being symmetrically punched with an elongated hole disposed to receive an anchor pin, said pin set through said elongated hole and into said tube welt being therefor thickened to provide anchorage therein, said gate thereby being held in frictional contact against said welt yet allowing vertical and lateral travel, the lower edge of said gate being extended to form a clasp disposed to engage and hold-to said tube welt, said clasp having a reflex bend beginning portion and hook ending portion providing a pressure point for downward pressure application and a positive welt grip, respectively, whereby a downward pressure on said reflex bend portion frees said gate to swing laterally to form any selected size water inlet, said inlet size being maintained by reengaging said clasp over said welt through an upward pressure on said clasp to produce the desired controlled metering or shutoff, meter markings along said tube welt to aid in the mixing or matching of water sets and means for blocking sweepage along said tube exterior by collaring its midpoint with a dam existing as a substantial outward lateral extension of the tube wall.]

*3. A ditch valve assembly for metering irrigation water comprising; a conduit means in the form of an open ended tube for positioning in a ditch bank, cap means having a closed end, an open end and wall means therebetween, the open end of said cap being disposed concentrically with respect to one extremity of said conduit for limited longitudinal telescoping engagement therewith, cooperating means on said cap and said conduit providing frictional*

*sliding sealing engagement therebetween, and window means in the wall of said cap whereby upon longitudinal motion of said cap along said conduit an inlet of varying size is formed by said window and extremity for selectively metering irrigation water therethrough.*

*4. The ditch valve assembly of claim 1 wherein said cooperating means is a circumferential welt on said cap depending toward said conduit and on said extremity depending toward said cap.*

*5. The ditch valve assembly of claim 1 further comprising a dam means depending from said conduit and disposed laterally outwardly therefrom to control seepage along the exterior of said conduit.*

*6. A ditch valve assembly for metering irrigation water comprising; a conduit means in the form of an open ended tube for positioning in a ditch blank, quadrant gate valve means cooperating with an extremity of said conduit to form an inlet of varying size, pivot means securing said gate to said extremity for lateral frictional movement thereacross yet allowing limited vertical movement, said extremity being swelled an amount sufficient to accommodate substantially the maximum flow allowed by said conduit though partially obstructed by said gate, and clasp means for securing said gate in a preselected position upon*

*upward pressure and vertical movement of said gate and for releasing said gate upon the application of downward pressure and resulting vertical movement of said gate whereby said gate may be selectively positioned to meter irrigation water through the assembly.*

References Cited

The following references, cited by the Examiner, are of record in the patented file of this patent or the original patent.

UNITED STATES PATENTS

| | | | |
|---|---|---|---|
| 2,453,792 | 11/1948 | Hufferd et al. | 251—147 |
| 2,628,056 | 2/1953 | Fuller | 251—147 |
| 2,815,039 | 12/1957 | Pickavance | 251—147 |
| 2,854,823 | 10/1958 | Fisher | 251—147 |
| 3,010,692 | 11/1961 | Ventoft | 251—147 |

FOREIGN PATENTS

| | | | |
|---|---|---|---|
| 29,959 | 11/1931 | Australia | 61—12 |

WILLIAM R. CLINE, Primary Examiner

U.S. Cl. X.R.

251—300, 343; 61—12